United States Patent
Kalin et al.

(10) Patent No.: US 8,762,226 B2
(45) Date of Patent: Jun. 24, 2014

(54) ITEM DISCOVERY TOOLS AND METHODS FOR SHOPPING IN AN ELECTRONIC COMMERCE ENVIRONMENT

(75) Inventors: Robert Kalin, Brooklyn, NY (US); Gregory Fodor, Jr., Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 499 days.

(21) Appl. No.: 13/100,810

(22) Filed: May 4, 2011

(65) Prior Publication Data

US 2012/0284145 A1   Nov. 8, 2012

(51) Int. Cl.
*G06Q 30/00*   (2012.01)
*G06Q 30/06*   (2012.01)

(52) U.S. Cl.
CPC ........ *G06Q 30/0603* (2013.01); *G06Q 30/0631* (2013.01)
USPC ....................................................... 705/26.7

(58) Field of Classification Search
USPC ..................................... 705/14, 26, 7; 706/21
See application file for complete search history.

(56) References Cited

U.S. PATENT DOCUMENTS

| | | | |
|---|---|---|---|
| 7,720,833 B1 | 5/2010 | Wen et al. | |
| 7,809,601 B2* | 10/2010 | Shaya et al. | 705/7.31 |
| 2006/0026048 A1* | 2/2006 | Kolawa et al. | 705/7 |
| 2007/0112704 A1* | 5/2007 | Tomkins et al. | 706/21 |
| 2008/0059281 A1* | 3/2008 | Tower et al. | 705/10 |
| 2010/0191714 A1 | 7/2010 | Wen et al. | |
| 2011/0093361 A1* | 4/2011 | Morales | 705/26.62 |
| 2011/0258049 A1* | 10/2011 | Ramer et al. | 705/14.66 |

* cited by examiner

*Primary Examiner* — Michelle L Le
(74) *Attorney, Agent, or Firm* — Lando & Anastasi, LLP

(57) ABSTRACT

A computer-implemented method includes prompting a first user to select one or more images representing merchandise items, receiving one or more image selections from the first user through the user interface, and determining a shopping preference of the first user based, at least in part, on the image selections. The shopping preference of the first user includes information about the merchandise items represented by the image selections. The method further includes identifying a second user having a shopping preference that is substantially similar to the shopping preference of the first user. The shopping preference of the second user includes information about one or more preferred merchandise items of the second user. The method further includes generating at least one shopping recommendation based on the shopping preference of the second user, and presenting the shopping recommendation to the first user.

30 Claims, 10 Drawing Sheets

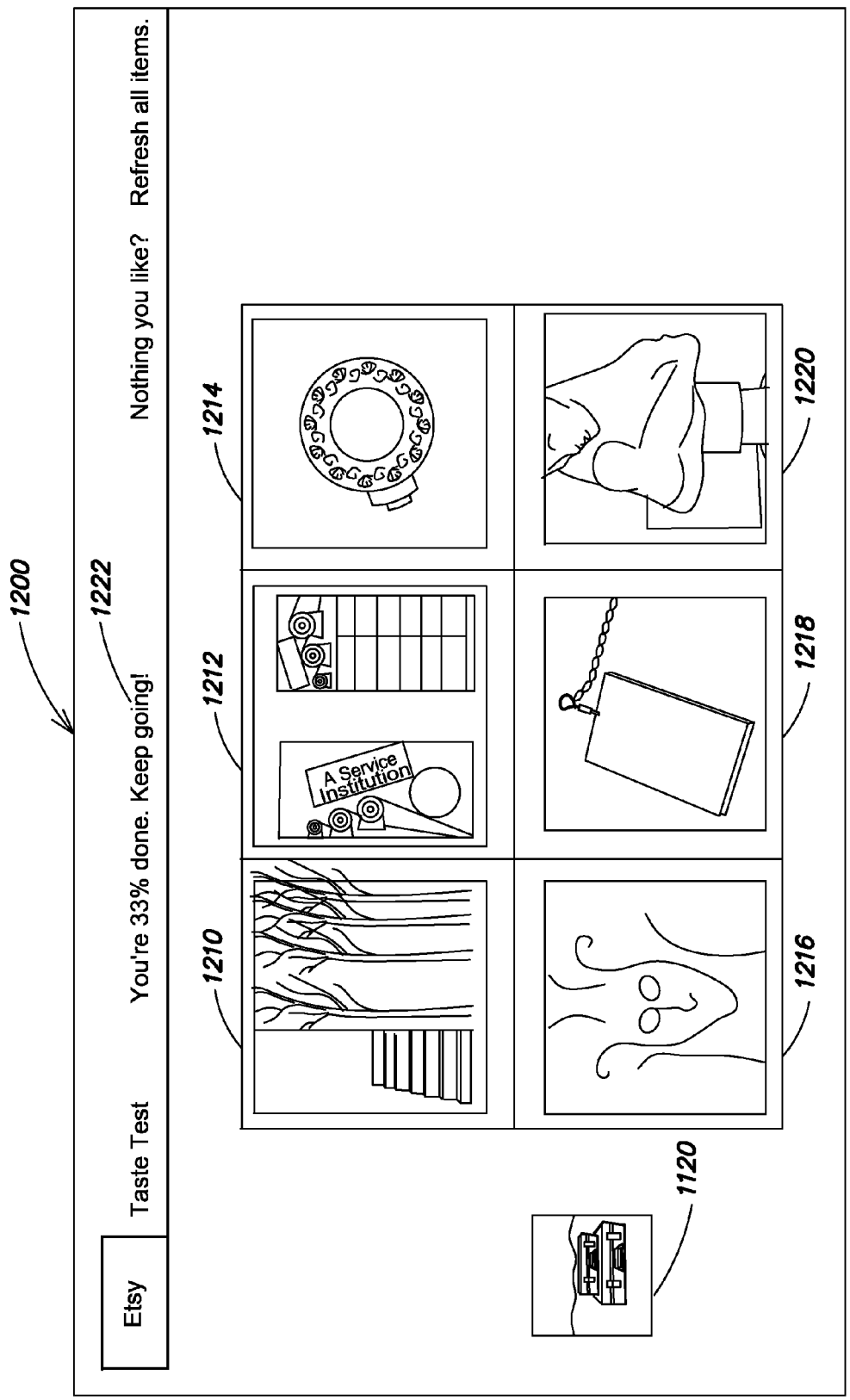

FIG. 7D

ITEM DISCOVERY TOOLS AND METHODS FOR SHOPPING IN AN ELECTRONIC COMMERCE ENVIRONMENT

BACKGROUND OF THE INVENTION

1. Field of the Invention

Embodiments of the present invention relate generally to electronic commerce.

2. Discussion of Related Art

Consumers are increasingly using the Internet to purchase goods and services through electronic commerce (also referred to herein as e-commerce) websites. The quantity and variety of items that can be purchased online is ever-increasing. To facilitate online shopping, tools have been developed that automatically recommend certain items to users. Such tools provide value by locating and presenting a selection of items that, while not specifically sought out by the user, may nonetheless be of interest to the user, thus enhancing the shopping experience. User interest may be gleaned from monitoring the user's search, browsing, and/or purchasing history. For example, content-based recommendations may be used to suggest items based on any content associated with the items, such as an item description, or other characteristics such as color, size, category, and so forth. Accordingly, content-based recommendations may generated by comparing the user's search query, browsing history, and/or purchasing activity against content associated with items for sale on the e-commerce website.

BRIEF SUMMARY OF THE INVENTION

One embodiment of the present invention includes an item discovery tool for shopping in an e-commerce environment, such as on one or more e-commerce websites. The discovery tool is designed to assess one or more shopping or purchasing preferences, or tastes, of a user, and further to assist the user in locating merchandise items that suit those tastes. The shopping preference assessment includes surveying a user interactively (e.g., through an e-commerce website) to collect shopping choice and preference information about the user in relation to a plurality of items. The survey includes presenting a series of images of merchandise items to the user, and asking the user to select one or more of the images representing items that are appealing to the user. For example, the user may be asked to select items that the user would enjoy having or using, or items that have aesthetic appeal to the user. Accordingly, a taste, or shopping preference, of the user can be determined based, at least in part, on the items selected by the user during the survey.

Although taste in a general sense may include sociological and economic concepts, which involve subjective and personal evaluations, taste may be evaluated in other terms as well or in the alternative. For example, the taste of the user may relate to one or more characteristics of the items selected by the user in the survey, such as description, color, material, construction technique, style, cost, age, origin, use, intended user, occasion (e.g., birthday, holiday, anniversary, and so forth), and/or any other characteristics of the selected items.

According to another embodiment of the present invention, one or more other users having substantially the same or similar tastes as the user can be identified based, at least in part, on the taste of the user. The tastes of the other users may be, for example, determined in the same manner as described above (i.e., by collecting preference information through an interactive survey). Accordingly, the user can be matched with the other users identified as having similar tastes. Furthermore, the one or more other users include people identified as tastemakers, that is, people who are known well enough such that their tastes and shopping preferences have statistically significant meaning.

It is appreciated, according to one embodiment, that tastemakers have a knack for knowing what merchandise items people with similar tastes are inclined to like or prefer. The tastemakers may include users who are frequent visitors to one or more e-commerce websites, frequent buyers, sellers, and/or users who frequently rate items on the website(s). By matching a user with other users having similar tastes, the user can receive shopping recommendations based on items preferred by the other users having similar tastes.

According to one embodiment, a computer-implemented method includes prompting, through a user interface, a first user to select one or more images each representing one or more merchandise items. The images are stored in an image database and are to be displayed to the first user through the user interface. The method further includes receiving, by a computer system, one or more image selections from the first user through the user interface, and determining a shopping preference of the first user based, at least in part, on the one or more image selections. The shopping preference of the first user includes information about the merchandise items represented by each of the image selections.

The method further includes identifying a second user having a shopping preference that is substantially similar to the shopping preference of the first user. The shopping preference of the second user includes information, stored in a user preference database, about one or more preferred merchandise items of the second user. The method further includes generating at least one shopping recommendation based on the shopping preference of the second user and presenting the shopping recommendation(s) to the first user through the user interface.

In another embodiment, identifying the second user may include assigning, by the computer system, a score to the second user according to an algorithm operative to use different types of activity stored in an activity database. For example, in one embodiment the different types of activity may include a frequency at which the second user has identified, to the computer system, the preferred merchandise items of the second user. The computer-implemented method may include ranking the second user according to the score. Generating the shopping recommendation(s) may be based on the ranking of the second user.

In yet another embodiment, the different types of activity may include, for each of the preferred merchandise items of the second user, a quantity of the preferred merchandise items of the second user that are preferred by a user other than the second user. In yet another embodiment, the different types of activity may include a percentage of the one or more preferred merchandise items of the second user that have been purchased by a user other than the second user. In yet another embodiment, the different types of activity may include a percentage of the one or more preferred merchandise items of the second user that have been purchased by the second user.

In yet another embodiment, the one or more preferred merchandise items of the second user may include a favorite item of the second user, an item purchased by the second user, an item sold by the second user, an item browsed by the second user, and/or an item curated by the second user in a treasury.

In yet another embodiment, the shopping recommendation(s) may include at least one of the preferred merchandise items of the second user.

In yet another embodiment, the shopping recommendation(s) may include a username of the second user. The username may be selectable by the first user within the user interface to cause the computer system to provide, to the first user through the user interface, information about the second user. The information may include a list of favorite items of the second user.

In yet another embodiment, the computer-implemented method may include choosing, by the computer system, the one or more images from the image database based on the shopping preference of the second user.

In yet another embodiment, the image selections may include a first image of a first merchandise item and a second image of a second merchandise item. The preferred merchandise items of the second user may include the first merchandise item and the second merchandise item. In yet another embodiment, the first image may be included in a first group of images and the second image may be included in a second group of images. Prompting the first user may include prompting, through the user interface, the first user to select one or more images from the first group of images prior to prompting the first user to select one or more images from the second group of images.

In yet another embodiment, the information about the one or more merchandise items may include a description of a respective one of the one or more merchandise items. The description may be stored in an item listing database. The description may include a name, color, style, shape, texture, material, construction, origin, age, function, and/or appearance of the merchandise item(s).

In yet another embodiment, the information about the preferred merchandise items of the second user may include an association between each of the preferred merchandise items of the second user and a user profile of the second user.

In yet another embodiment, the computer-implemented method may include storing shopping recommendation data, including the shopping recommendation(s), in a shopping recommendation database, and enabling the first user to retrieve the shopping recommendation data through the user interface.

According to one embodiment, a computer-implemented method includes mapping each of a plurality of merchandise items listed in a database to at least one of a plurality of users of an e-commerce website based on a ranking of each of the users. The method further includes generating a first webpage having a first plurality of user-selectable images each representing one of a first subset of the merchandise items, and providing the first webpage to a survey subject through a user interface of a user computing system connected to the e-commerce website over a communications network. The method further includes receiving, through the user interface, a first image selection from the survey subject. The first image selection represents one of the plurality of merchandise items selected by the survey subject.

The method further includes generating a second webpage having a second plurality of user-selectable images each representing one of a second subset of the merchandise items. The method further includes providing the second webpage to the survey subject through the user interface of the user computing system and receiving, through the user interface, a second image selection from the survey subject. The second image selection represents one of the merchandise items selected by the survey subject.

The method further includes generating a third webpage having a list of recommended users. The list includes at least one of the users that is mapped to the merchandise item associated with the first image selection and the merchandise item associated with the second image selection. The method further includes providing the third webpage to the survey subject through the user interface of the user computing system.

In another embodiment, the computer-implemented method may include mapping each of the plurality of merchandise items to at least one of the users of the e-commerce website based on a preference of the user(s) for a respective one of the items. In yet another embodiment, at least one of the first plurality of images and at least one of the second plurality of images each represent a merchandise item preferred by the user(s).

In yet another embodiment, the merchandise item preferred by the at least one of the users may be a favorite item of the at least one of the users. In yet another embodiment, the merchandise item preferred by the at least one of the users may be an item offered for sale by the at least one of the users. In yet another embodiment, the merchandise item preferred by the at least one of the users is an item curated by the at least one of the users in a treasury.

In yet another embodiment, the computer-implemented method may include ranking each of the users based on how frequently the respective user has selected any merchandise item as a favorite merchandise item over a period of time. In yet another embodiment, the period of time is approximately 120 days. In yet another embodiment, the frequency with which the respective user has selected any merchandise item as a favorite merchandise item is approximately five or more merchandise items per day.

In yet another embodiment, the computer-implemented method may include ranking each of the users based on how frequently one or more other users have selected a merchandise item as a favorite merchandise item that is the same merchandise item that the user has selected as a favorite merchandise item. In yet another embodiment, the frequency with which the other users have selected the merchandise item as a favorite merchandise item is approximately 500 times. In yet another embodiment, the computer-implemented method may include ranking each of the users based on the frequency with which a favorite merchandise item of one of the user has been purchased by any user other than the users.

In yet another embodiment, the computer-implemented method may include ranking each of the at least one of the plurality of users based on the frequency with which a favorite merchandise item of one of the at least one of the plurality of users has been purchased by the same one of the at least one of the plurality of users.

According to one embodiment, a computer readable medium has computer-executable instructions stored thereon. The computer-executable instructions, when executed by a computer, cause the computer to perform a method including prompting, through a user interface, a first user to select one or more images each representing one or more merchandise items. The images are stored in an image database and are to be displayed to the first user through the user interface. The method further includes receiving, by a computer system, one or more image selections from the first user through the user interface, and determining a shopping preference of the first user based, at least in part, on the one or more image selections. The shopping preference of the first user includes information about the merchandise items represented by each of the image selections.

The method further includes identifying a second user having a shopping preference that is substantially similar to the shopping preference of the first user. The shopping preference of the second user includes information, stored in a user preference database, about one or more preferred merchandise items of the second user. The method further includes generating at least one shopping recommendation based on the shopping preference of the second user and presenting the shopping recommendation(s) to the first user through the user interface.

According to one embodiment, a computer readable medium has computer-executable instructions stored thereon. The computer-executable instructions, when executed by a computer, cause the computer to perform a method including mapping each of a plurality of merchandise items listed in a database to at least one of a plurality of users of an e-commerce website based on a ranking of each of the users. The method further includes generating a first webpage having a first plurality of user-selectable images each representing one of a first subset of the merchandise items, and providing the first webpage to a survey subject through a user interface of a user computing system connected to the e-commerce website over a communications network. The method further includes receiving, through the user interface, a first image selection from the survey subject. The first image selection represents one of the plurality of merchandise items selected by the survey subject.

The method further includes generating a second webpage having a second plurality of user-selectable images each representing one of a second subset of the merchandise items. The method further includes providing the second webpage to the survey subject through the user interface of the user computing system and receiving, through the user interface, a second image selection from the survey subject. The second image selection represents one of the merchandise items selected by the survey subject.

The method further includes generating a third webpage having a list of recommended users. The list includes at least one of the users that is mapped to the merchandise item associated with the first image selection and the merchandise item associated with the second image selection. The method further includes providing the third webpage to the survey subject through the user interface of the user computing system.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7C shows yet another webpage displaying a plurality of item images in accordance with the embodiment of FIG. 7A; and FIG. 7D shows a webpage displaying shopping recommendations in accordance with the embodiment of FIG. 7A.

DETAILED DESCRIPTION OF THE INVENTION

Figure 1:
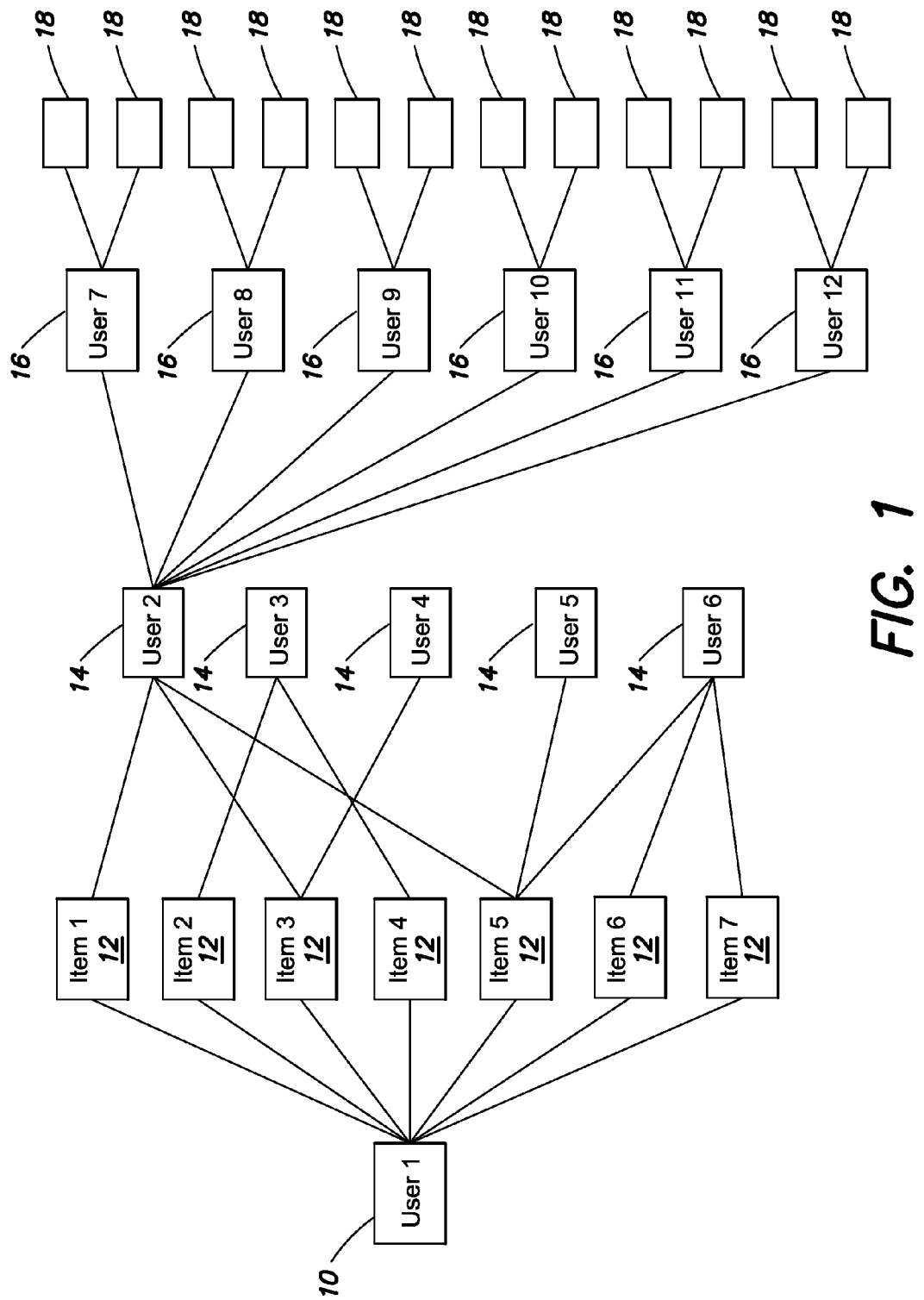
FIG. 1 is a block diagram showing exemplary user-to-item relationships of an e-commerce system in accordance with one embodiment of the present invention.

Embodiments of the invention are not limited in their application to the details of construction and the arrangement of components set forth in the following description or illustrated in the drawings. Embodiments of the invention are capable of other embodiments and of being practiced or carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Embodiments of the present invention include item discovery tools and methods for shopping within an e-commerce environment that is provided by an e-commerce platform, including one or more e-commerce websites. The e-commerce environment supports an online marketplace where goods, services, and other articles of commerce can be bought and sold over the Internet or other computer networks, such as through websites designed for these purposes. The goods and services may be physical and tangible, or virtual (e.g., privileges for accessing restricted content on a website, discount offers, or other non-physical goods). The e-commerce platform may be tailored to serve particular purposes, such as business-to-business commerce (e.g., wholesale), business-to-consumer commerce (e.g., on-line retail), private sales, auctions, or individual store fronts, and may even be further specialized to support a particular marketplace (e.g., for clothing, housewares, artwork, and other products and/or services). The e-commerce platform may also provide features that facilitate activity within the marketplace, such as search engines, social media (e.g., on-line forums, blogs, social networks, shared photo and video albums, wilds, netmeetings, and virtual entertainment), financing and payment tools (e.g., banking, fund transfer, credit services), shipping and freight services, among others. The e-commerce platform may be backed by so-called "brick-and-mortar" facilities, such as retail stores, distribution warehouses, and similar facilities, or the platform may merely be an electronic facilitator of trading markets between independent individuals and businesses.

Overview

According to one embodiment of the present invention, an e-commerce website supported by an e-commerce platform hosts listings and facilitates sales transactions for large numbers of saleable items. As used herein, an item or merchandise item refers to a good, service, an article of commerce, or any combination thereof that can be sold, traded, or offered for sale or trade through the e-commerce website or through other channels (e.g., other websites, classified advertisements, physical stores, or an auction, among others).

Users of the e-commerce website can search for, browse, and/or purchase items listed by various sellers or merchants using one or more computer systems. Due to the large number of items that are typically listed on the website (or on other websites) at any given time, it is appreciated that a user may not necessarily locate items of interest using conventional searching and browsing techniques. For example, one conventional technique for locating items on an e-commerce website includes receiving a textual search query from a user. A content-based search of the item listings (e.g., in a database of the website) may subsequently match one or more words or phrases of the search query to descriptive terms that are associated with each item, for example, "men's watches" may return a set of results containing wrist or pocket watches in men's styles.

However, there are likely to be a large number of items matching the query "men's watches," possibly dozens or hundreds, and large sets of search results can overwhelm the user with choices. Although various techniques for narrowing the set of search results down have been developed, such as by adding additional terms to the search query, ranking the items based on relevance to the query, or ranking items based on sales popularity, according to at least one embodiment of the present invention, it is appreciated that conventional searching techniques do not utilize or reflect any of the sociological characteristics of the user. One such characteristic of user shopping preference relates to the user's taste.

Taste, as used herein, refers at least to a characterization of a user's personal preference, choice, or judgment with respect to shopping and/or merchandise. For example, taste may be an aesthetic preference, such as a preference for the color blue. In another example, taste may relate to economic choice, such as choosing to purchase only, or primarily, items priced below $20. In yet another example, taste may be characterized by other sociological characteristics, such as a preference for clothing of a style that is in current fashion or worn by celebrities.

However, it is appreciated that conventional searching techniques generally rely on user-supplied search terms. Using conventional search techniques, these user-supplied search terms frequently do not yield search results that are well-tailored to the user's tastes. For example, the results may merely suggest items that are similar in content but not appropriate in style (e.g., suggesting a pink cellular telephone carrying case to a male user who enters a search for "cell phone cases"). The results, therefore, may include many items that are not compatible with the user's tastes, and consequently these conventional searches tend to perform poorly at least in terms of recommending items that are of interest to the user, or items that are compatible with the user's taste, as well as in terms of facilitating sales of those items through relevant and high quality search results.

Therefore, according to an embodiment of the present invention, an improved shopping recommendation method is disclosed herein, which can provide search results and/or shopping recommendations that are more closely tailored to the shopping preferences or tastes of the user than recommendations based primarily on user-supplied search terms. It is appreciated that such preferences, or tastes, can include highly subjective attributes. One technique disclosed herein leverages the concept of crowdsourcing, in which the tastes or shopping preferences of multiple users are matched or compared to the tastes or shopping preferences of an individual user, as determined through an image-based survey or quiz of the individual user.

According to one embodiment, the survey includes images (e.g., photographs, illustrations, or other visual representations) of various items that are presented by a user computing system to the user within a user interface of the user computing system. One example of such a user interface is a web page displayed by a web browser such as the commercially distributed WINDOWS® INTERNET EXPLORER® 7 browser software by Microsoft Corporation of Redmond, Wash., or other similar browsers. The user may select one or more of the images to indicate a preference for the items represented by the selected images. For example, if the user is simultaneously presented with six images of six different items, the user may select one of the six images to indicate a preference for that item over the other five items. Additional sets of images may be subsequently displayed for the user to select additional images from. The basis for selecting the images is personal to the user and not necessarily tied to any particular search motive. For example, the survey may be taken by a user who is not searching for any particular item, but rather is simply browsing, as one might do in an antique store or crafts shop. This browsing activity is recorded by one or more computer systems for subsequent analysis with respect to taste.

According to one embodiment, it is appreciated that when many individuals (collectively called a group) indicate a preference for the same or similar items, an individual user also having a preference for at least one of those similar items can be characterized as having the same (or similar) taste as the group. Accordingly, the user responses to a survey, such as described above, can be used to generate shopping recommendations. In one example, a set of search results, or recommendations, includes a list of other users having similar tastes or shopping preferences as the user taking the survey. The search results can be automatically generated based on the tastes of the user as gleaned from responses to the survey (e.g., the search results may include a list of users who have expressed a preference in the same or similar items as the user taking the survey). In another example, a set of search results, or recommendations, includes items that are listed on the e-commerce website by other users (e.g., "sellers") that sell or prefer (e.g., "favorite" or curate) one or more of the items selected by the user during the survey. For example, if a user chooses Item A during the survey, the recommendations may include Item B, which is listed on the website by the same seller that also lists Item A. In another example, if the user chooses Item C during the survey, the recommendations may include Item D, which is a favorite item of another user who has purchased or expressed a preference for Item C.

FIG. 1 is a block diagram showing exemplary user-to-item relationships according to one embodiment of the present invention. FIG. 1 is intended to introduce the reader to one conceptual basis for a computer system that is configured to provide recommendations to a user 10 based on the taste or shopping preferences of the user. The user preferences may be characterized by, for example, certain characteristics of a set of items that are of particular interest to the user. Such characteristics may include an item name, description, color, material, construction, age, or other descriptive characteristic.

In one example, user 10 is associated with a first set of items 12 that are of interest to the user. Items 12 are, for example, items listed for sale on the e-commerce website, and user 10 is one of a plurality of users of the e-commerce website. In particular, items 12 may be items selected by user 10 during an interactive survey. Information about the user interests can be acquired, for example, through a quiz or survey of the user in which the user identifies, to a computer system, one or more items that are preferred with respect to other items, such as will be described in greater detail below. Although it is possible that some of the items 12 may not be available for purchase at any given time, for example, if the item is sold, discontinued, out of stock, or otherwise unavailable, the items identified by the user during the survey are primarily intended to be representative of user shopping preferences and interests, and therefore may be useful when characterizing the user interest overall regardless of the actual availability of any particular one of the items 12. The first set of items 12 may include any number of items, and generally a large number of items associated with the user will enable the computer system to, statistically, provide better recommendations due to a larger sample size. Certain characteristics of each item 12 can be used to compile a shopping preference or taste profile for the user within a database of the computer system. The characteristics of each item 12 may include, for instance, color, size, style, name, or other characteristics that are typically associated with an item.

Additionally, one or more users 14, other than user 10, may also be associated with any of the items 12. For example, as shown, user 14 "User 2" is associated with items 12 "Item 1," "Item 3," and "Item 5." Therefore, it can be said that "User 1" and "User 2" both prefer "Item 1," "Item 3," and "Item 5." Each user 14, also referred to herein as a tastemaker, may be specifically selected, for example, based on one or more criteria using an algorithm, as will be described below. These criteria, among other things, are used by the computer system to identify a group of users who are expected to have a particular knack for knowing what types of items other users are interested in. One definition of a tastemaker is a person who popularizes a new fashion or sets a trend with respect to any kind of item (e.g., clothing, music, books, and so forth).

Based on the associations between user 10 and user 14 (through item 12), further associations can be identified. For example, an additional user 16 "User 7" can be associated with user 14 "User 2" based on the preferences of "User 7" in a manner similar to that described above with respect to "User 1" and "User 2." For example, "User 7" may be associated with one or more of the same items that "User 2" is associated with. Therefore, it can be said that "User 7" has similar preferences to "User 2" and, accordingly, "User 1."

In turn, each user 16 is associated with one or more additional items 18 in a manner similar to the associations of user 10 to item 12, such as described above. Item 18 is a preferred item of user 16. Therefore, the following logic can be applied to the associations illustrated in FIG. 1: "User 1" prefers "Item 1," which is also preferred by "User 2." Because "User 7" has similar preferences to "User 2," item 18, which is preferred by "User 7," may be recommended to "User 1" based on the commonality of preferences between "User 1" and "User 7." Therefore, because the users 14 or tastemakers are selected based on specific criteria, the illustrated associations are particularly useful for generating recommendations. It should be understood that the associations shown in FIG. 1 are merely exemplary, and that other associations may be implemented with similar results. The above associations may be stored within a database of a computer system, such as a user preference database 124 described below with respect to FIG. 2.

Figure 2:
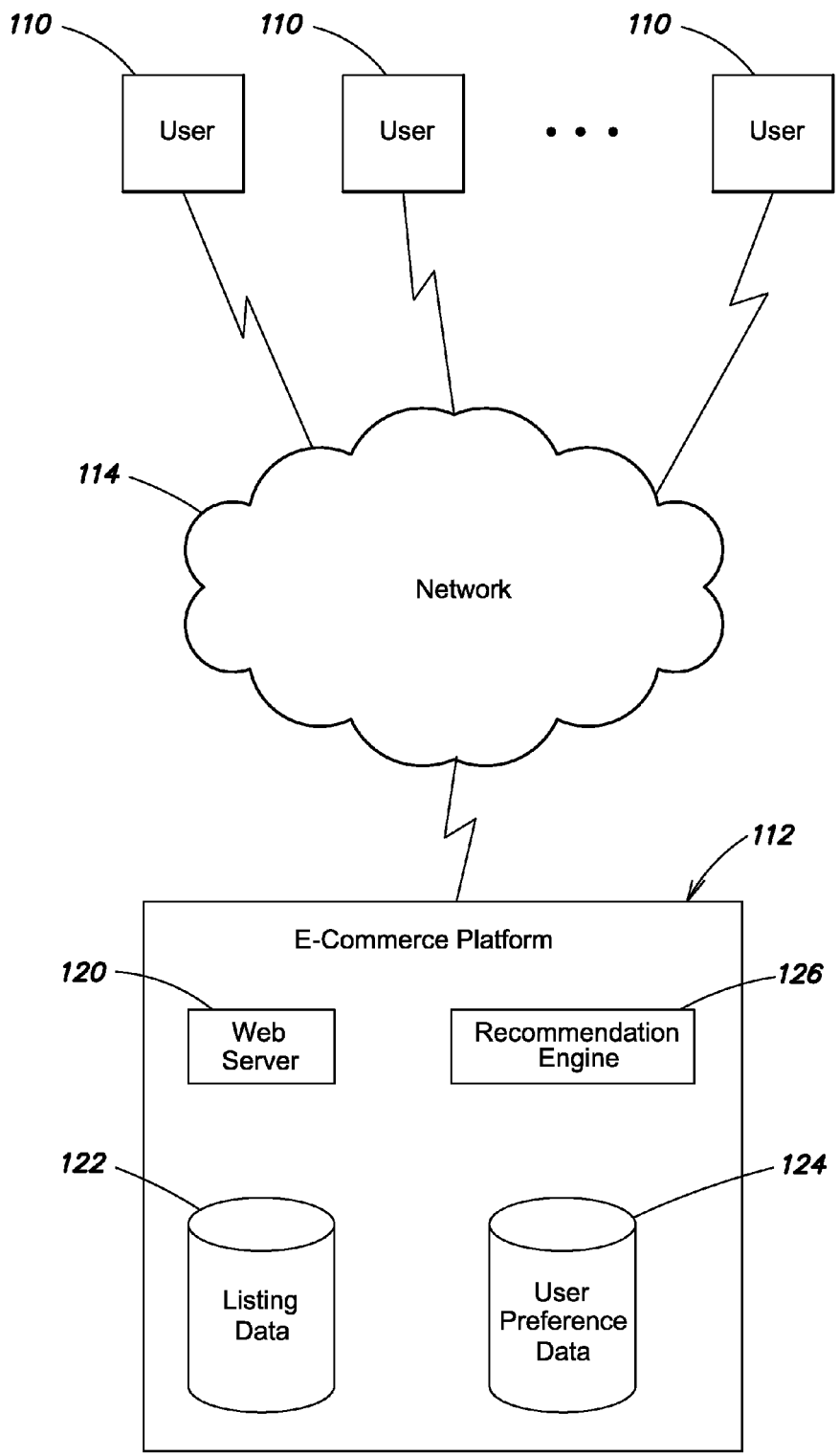
FIG. 2 is a block diagram of an e-commerce system in accordance with one embodiment of the present invention.

FIG. 2 illustrates a block diagram of an e-commerce system in accordance with one embodiment of the present invention. One or more users 110, each using a client computing system (not shown), connect with an e-commerce platform 112 through a network 114, such as the Internet or other wide area network. E-commerce platform 112 includes a web server 120, a listing database 122, a user preference database 124, and a recommendation engine 126. Listing database 122 includes listing data associated with each of a plurality of items listed within the e-commerce system. For example, the listing data may include a name or title for each item that is listed for sale, a description of the item (or other visual representation), information about purchasing the item, and other information. Each user 110, who may be, for example, a buyer, seller, or other individual or entity, uses the client computing system to interact with e-commerce platform 112. A ranking may be assigned to each user 110 to quantitatively distinguish one user from another.

User preference database 124 may be used to store information about the preferences or interests of each user 110. For example, user preference database 124 may include items in a user purchase history, recently viewed items and/or browsing history, search queries, item ratings (e.g., items marked as favorites), and items placed in a virtual shopping cart for prospective purchase by the user 110. A weight or ranking may optionally be assigned to each item based on other factors, such as an item's popularity among other users or number of units of the item sold. Recommendation engine 112 uses information obtained from user 110, listing database 122, and user preference database 124 to generate recommendations, including item recommendations and user recommendations, as will be described below.

Figure 3:
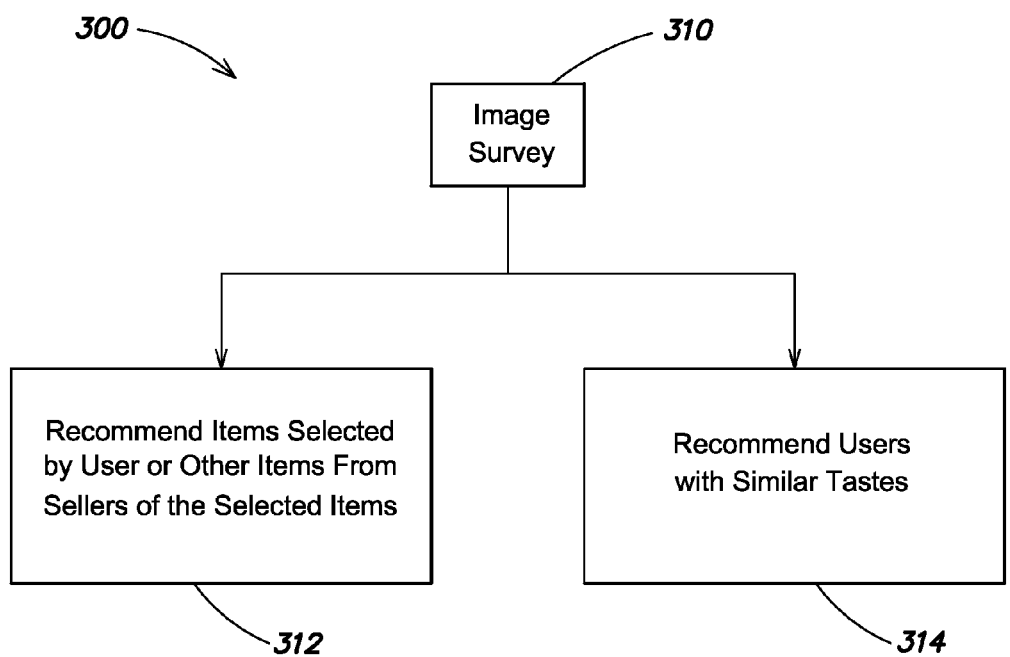
FIG. 3 is a flow diagram of an item recommendation process of an e-commerce system in accordance with one embodiment of the present invention.

FIG. 3 is a flow diagram showing an overview of an item recommendation process 300 according to one embodiment of the present invention. Generally, the shopping preferences of a user are identified, and the computer system generates recommendations based on the identified user preferences. It is appreciated that one technique for identifying user preferences, and in particular one or more items that the user has an interest in, is to survey or quiz the user. As will be described herein, in one embodiment the survey includes presenting the user with a sequence of images representing various items listed on the e-commerce website. Typically, the images are taken from the item listings, and are photographs or illustrations of the actual item or a representative item. The images may optionally be displayed to the user in a web browser without annotations or captions to focus the attention of the user to on the aesthetic characterizations of the items in the images rather than textual descriptions of the items.

Initially, the user participates in an online image survey (act 310). The image survey may be generated and controlled by a component (e.g., a server) of the e-commerce system. The image survey includes photographs or visual representations of various items, which are listed on the e-commerce website, that are displayed to the user in groups, for example, six images at a time, within a user interface of a user device (e.g., a web page within a web browser running on a personal computer that is connected, through a communication network, to the e-commerce system). The user may select one of the images from each group using an input device, such as a mouse. The survey may include displaying multiple groups of images to the user in succession, enabling the user to select multiple images during the course of the survey.

At the end of the survey, the e-commerce system may optionally generate one or more recommendations based on the user image selections acquired during the survey (acts 312 and/or 314). There are at least two types of recommendations: recommended items and recommended users. For example, one or more items may be recommended. The recommended items may include any of the items selected by the user during the survey and/or other items that are listed on the e-commerce website by sellers of the items selected by the user (act 312). The former may produce desirable recommendations because the user has already indicated that he or she prefers those items over the other items displayed during the survey. The latter may produce desirable recommendations because it can be presumed that if a user prefers one or more items offered by a seller (such as indicated by the user during the survey), the likelihood is greater that the user will also prefer items not displayed in the survey, but are listed by the same seller as the items the user prefers, than the likelihood that the user will prefer items sold by a different seller.

In another example, one or more recommended users having similar tastes to the survey user may be suggested to the survey user (act 314). That is, rather than (or in addition to) recommending items, process 300 can be configured to recommend specific users (who may be tastemakers). It is appreciated that conventional search engines, in particular with respect to e-commerce systems, typically recommend items, but not users. Therefore, in one embodiment of the present invention, a list of user names corresponding to the recommended users is displayed on a web page in the web browser. These recommended users represent individuals who have similar tastes to the user, and therefore may be able to provide item recommendations that are desirable to the user. For example, the user may select one of the recommended users using, e.g., a mouse, and the computer system can respond to the selection by displaying a list of the selected user's favorite items and/or sellers on a web page. Therefore, the recommended items are items that are recommended by virtue of, or on the basis of, other users having similar tastes to the survey user.

Tastemakers

Figure 4:
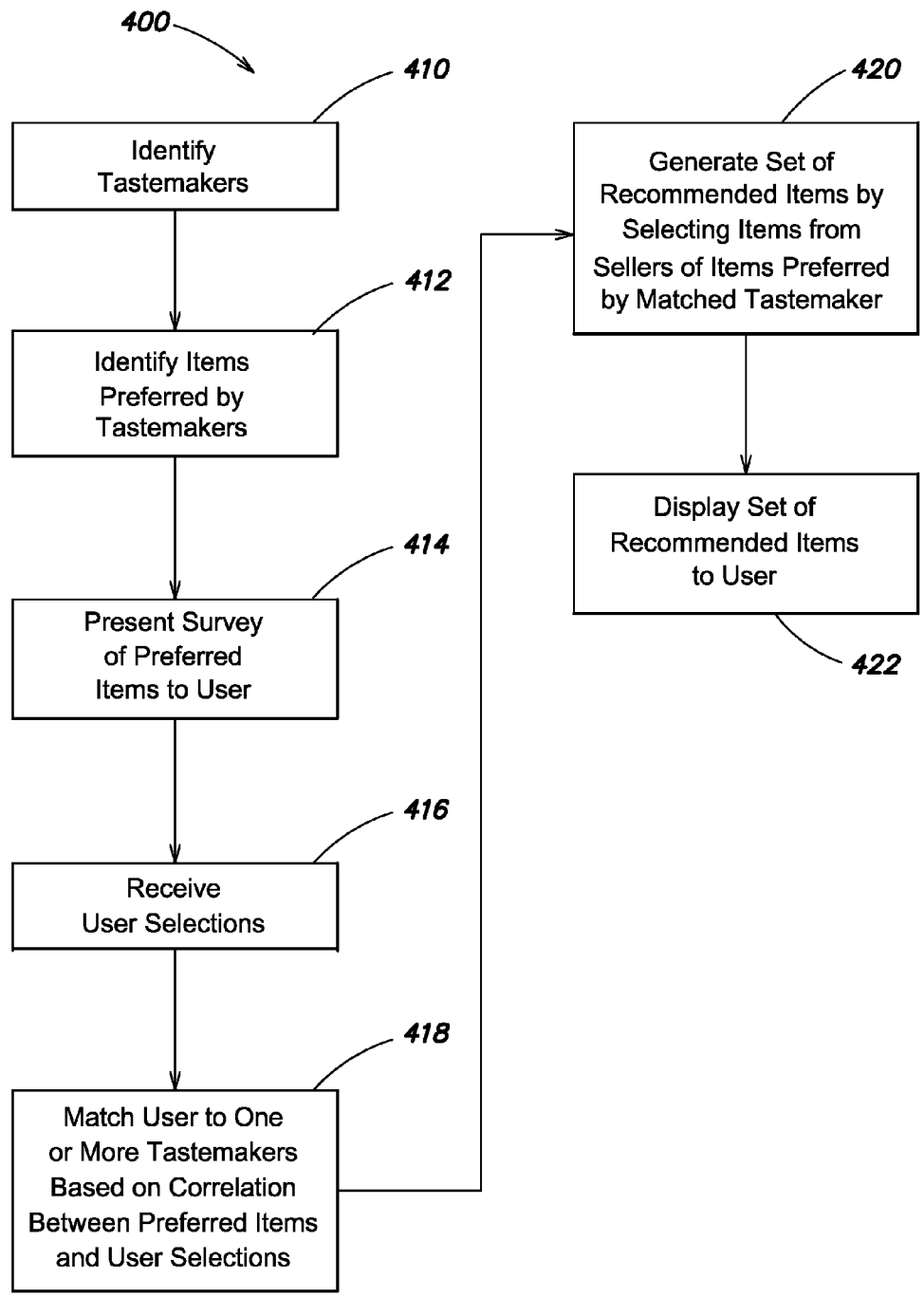
FIG. 4 is a flow diagram of an item recommendation process of an e-commerce system in accordance with another embodiment of the present invention.

FIG. 4 illustrates a flow diagram for an item recommendation process 400, according to another embodiment of the present invention. The e-commerce system performs a tastemaker characterization process in which one or more users are characterized as tastemakers (act 410). A tastemaker may be any user, and in particular, a user meeting certain criteria. In one embodiment, a tastemaker is a user who, by virtue of meeting the criteria, is someone who has, or would reasonably be expected to have, a knack for knowing what items that people having similar tastes would be interested in. A tastemaker may be categorized as a male, female, or either. For example, if a user specifies a preference for men's clothing, then only tastemakers who are male may be included in the recommendations. In another example, if the user specifies a preference for gardening items, then tastemakers of either gender may be included in the recommendations.

In one embodiment, a user is characterized as a tastemaker by assigning a score to the user according to one or more of the following criteria:

The frequency with which the user has indicated a preference for any item on the e-commerce website (e.g., five items per day, on average, over the past 120 days, may be considered ideal). Such a preference may, for example, be indicated when a user "favorites" items that they like using an item rating feature of the website (e.g., "like," "dislike," star ratings, and other forms of rating a preference for an item). It is appreciated that the frequency represents a level of activity that, if too low or too high relative to an ideal level, can be less reliable as an indicator of taste, and therefore this criterion can be weighted or discounted accordingly (e.g., by lowing the score logarithmically).

Of the items that the user has indicated a preference for (e.g., "favorite" items), the number of other users who have also indicated a preference for the same item(s) (e.g., 500 users). It is appreciated that the number of users indicating a preference for the same item(s), if too small or too large, can be less reliable as an indicator of taste, and therefore this criterion can be weighted or discounted accordingly. For example, if too many users prefer the same item, it is more likely that the user is merely a "follower" of popular items, as opposed to being someone who is expressing a genuine interest based on personal taste. Likewise, if not enough users prefer the same item, it is more likely that the user does not have interests in common with others.

Of the items that the user has indicated a preference for, the percentage of those preferred items that were actually purchased by other users (e.g., within the past 120 days).

Of the items that the user has indicated a preference for, the percentage of those preferred items that were purchased by the user him or herself.

Each of the above criteria can be used in conjunction with one or more other criteria to determine the score or ranking that is used to characterize the user as a tastemaker, and the relative ranking of one tastemaker with respect to another. For example, users who are more active are more likely to be tastemakers and to have higher scores than less active users. Weighting any of the above criterion with respect to other criteria increases (or decreases) the likelihood that particular criterion will affect the score. If the criteria are applied to a plurality of users, users having a relatively high score (e.g., a score in the top 10% of all scores) may be identified as tastemakers. Further, tastemakers may be further identified based on gender (e.g., tastemakers may include the top 10% of men and/or the top 10% of women). According to one embodiment, the score is a linear combination of the above criteria and is normalized to a range of zero to one (0-1). The process of characterizing users as tastemakers may occur on a recurring basis (e.g., hourly, daily, weekly, etc.). Thus, different users may be characterized as tastemakers at different times (e.g., users who are not tastemakers today may become tastemakers tomorrow, and users who are tastemakers today may not be tastemakers tomorrow). Further, one user (e.g., a male user) may be characterized as a tastemaker with respect to men's items only, for example, while another user may be characterized as a tastemaker with respect to all items.

According to another embodiment, if a tastemaker indicates a preference for an item within a virtual store of the e-commerce website (also referred to herein as a shop), that tastemaker is considered a tastemaker for that store. The preference may be indicated, for example, when the user "favorites" the item, places the item into a virtual shopping cart, purchases the item, curates the item in a treasury (or virtual collection of items), and/or recommends the item to another user. Considered differently, a store may be associated with one or more tastemakers, each of whom has indicated a preference for an item in the respective store.

In some situations, certain preferences may be excluded. For example, if a male user indicates a preference for a women's lingerie item, that user is not a tastemaker for the store selling the lingerie item. In another example, certain blacklist terms or conditions may be used to exclude certain preferences (e.g., offensive or inappropriate terms, wedding items, general supplies, or adult-only items may be excluded to improve the results of the recommendation).

In one embodiment, each virtual store is assigned a unique identification number (store ID), and each user is also assigned a unique identification number (user ID). For example, Shop 1 may have a shop ID of "shop_1," User 1 may have a user ID of "user_1," and so forth. The store ID may be mapped to one or more user IDs, where each of the mapped user IDs represents a tastemaker. Thus, in one example, shop_1->{user_1, user_2, user_3}; shop_2->{user_1, user_3, user_4}, where shop_1 is mapped to user_1, user_2, and user_3, and shop_2 is mapped to user_1, user_3, and user_4. In this example, shop_1 and shop_2 are each associated with user_1 and user_3.

In one embodiment, two stores are considered to be reachable from one another if they have at least two tastemakers in common. Reachability is a factor used (e.g., in a matrix) to relate different items from different stores together. Such relations may be used, for example, to provide item recommendations to a user who has expressed a preference for one or more particular items in a first store by suggesting items from a second store that is reachable from the first store. For example, if Tastemaker 1 and Tastemaker 2 each have item preferences in both Shop A and Shop B, Shop A is reachable from Shop B, and vice versa. Thus, in one example, if a user indicates a preference for an item in Shop A, a different item in Shop B (as opposed to another Shop C) may be recommended to the user based on the common tastemaker preferences for items in Shops A and B.

In another embodiment, a strength of the reachability factor can be measured by the number of tastemakers each store has in common (e.g., if Shops A and B both have numerous common tastemakers). Accordingly, the strength of the reachability factor may be used in selecting items for recommendation to the user (e.g., items in stores having a higher or stronger reachability factor may be given greater weight when selecting items to recommend to the user).

Survey

Once the tastemakers are identified (act 410), one or more items that are preferred by each of the tastemakers are identified (act 412) by a preferred item identification engine operating on the e-commerce system. The preferred item identification engine searches the database of items to identify items that each of the identified tastemakers has indicated as a favorite, browsed (e.g., viewed online), curated into a treasury (e.g., placed into a virtual online collection), placed into a virtual shopping cart, purchased, referred to a friend, or otherwise marked as being of interest. Other techniques for identifying the tastemaker's preferred items are possible. Some or all of these items will be used to generate the image survey. A more detailed description of one embodiment of the image survey is discussed below with respect to FIG. 5.

Figure 5:
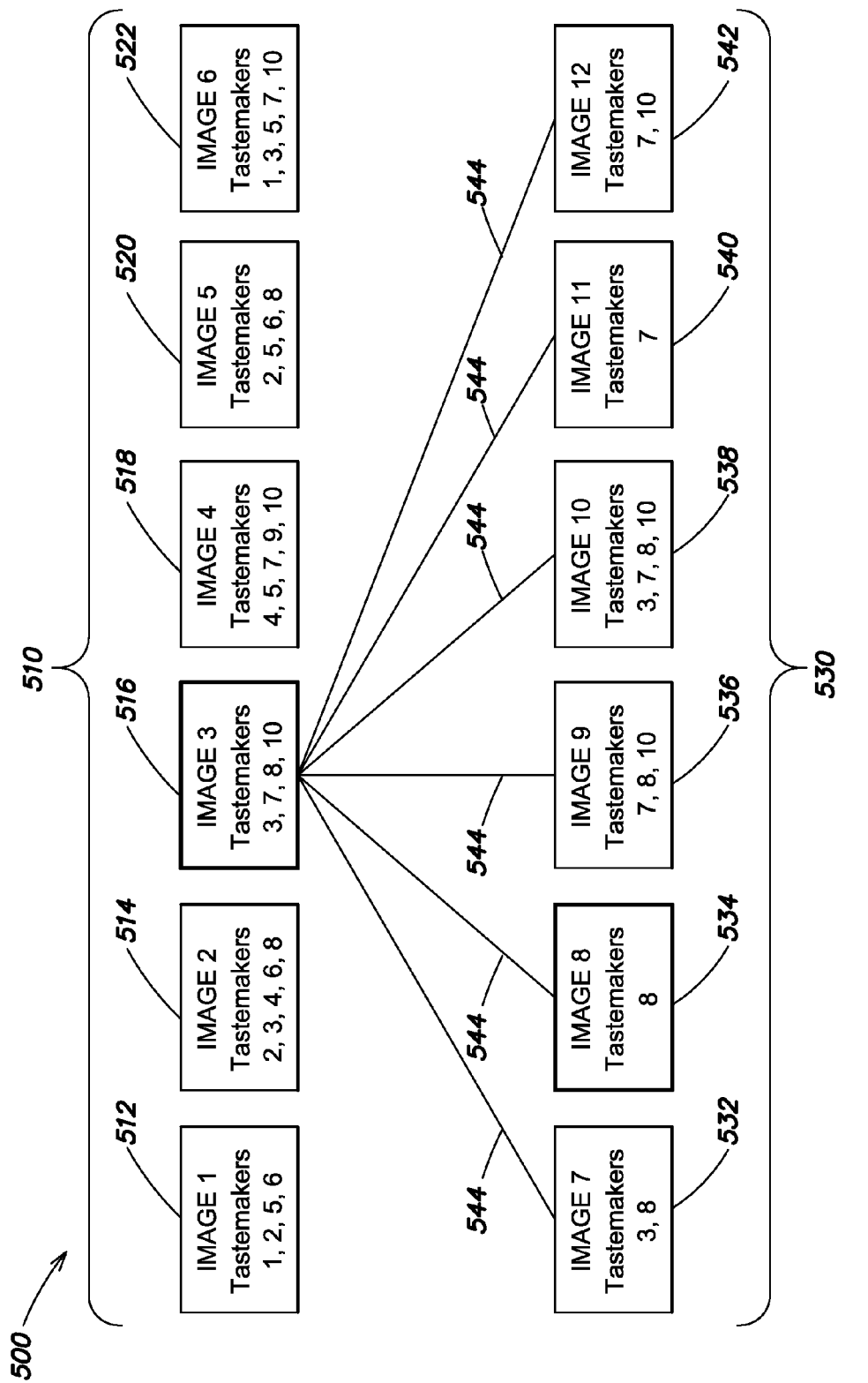
FIG. 5 is a block diagram illustrating a portion of the recommendation process of FIG. 4.

According to one embodiment of the present invention, FIG. 5 is a block diagram illustrating a portion of an image survey 500, such as described above with respect to FIG. 4, and in particular, acts 414 and 416. As discussed above, prior to presenting the survey, one or more tastemakers are identified using, for example, various criteria (see, e.g., act 410). Once the tastemakers are identified, one or more items that are preferred by the identified tastemakers are identified (see, e.g., act 412). The preferred items may be identified, for example, based on the respective tastemaker's favorite items, or using other factors such as matching item descriptions to search queries performed by the tastemaker, items in the tastemakers' virtual shopping carts, and so forth.

After the preferred items are identified, a first group of items, indicated at 510 in FIG. 5, is selected by the system from all of the identified preferred items and presented to the user through a user interface, such as a web browser, beginning the survey. The items are represented, in one embodiment, as images, which may be, for example, individual photographs or illustrations of the items. All of the items in the first group are displayed to the user at the same time. The first group of items 510 may include any number of items; in the example provided, there are six (6) images identified as Images 1-6 at 512, 514, 516, 518, 520, and 522, respectively. The number of items in the group should be selected with the understanding that, preferably, the user can view all of the items in the group simultaneously on a display. The number of items should also be sufficient to provide the user with a variety of items from which to choose (e.g., more than approximately three). Each of the items 512, 514, 516, 518, 520, and 522 are associated with (or preferred by) one or more of the identified tastemakers, who are identified as Tastemakers 1-10 in this example. For example, Image 1 512 is associated with Tastemakers 1, 2, 5 and 6.

After the first group of items 510 is presented to the user, the user may select one of the items from the group using, for example, an input device such as a mouse. In this example, the user selects Image 3 516, which is associated with Tastemakers 3, 7, 8, and 10. Subsequent to receiving the user selection, the system selects a second group of items, indicated at 530, and presents them to the user. Each of the items in the second group of items 530 is associated with one of the tastemakers associated with the item selected from the first group 510, e.g., Tastemakers 3, 7, 8, and 10 only. Thus, the items in the second group of items 530 are a subset of the items preferred by all of the tastemakers. The second group of items 530 may include any number of items, such as described above with respect to the first group of items 510. In the example provided, there are six (6) images in the second group of items 530 identified as Items 7-10 at 532, 534, 536, 538, 540, and 542, respectively. It should be understood that any of Items 7-10 may be the same as Item 3 516, or any other of Items 1-6 that are preferred by Tastemakers 3, 7, 8 and 10. Further, all of the Items 7-10 may be different from Items 1-6.

After the second group of items 530 is presented to the user, the user may select one of the items from the group. In this example, the user selects Image 8, which is associated with Tastemaker 8 only. At this point, it can be determined that the user shares similar taste in items with Tastemaker 8. The survey may continue with additional groups of items, such as described above, to further refine the results and/or to identify other tastemakers (i.e., other than already-identified Tastemaker 8) with whom the user shares a similar taste. Alternatively, the survey may begin again by representing the first group of images 510.

In one embodiment, the image survey, including images representing some or all of the preferred items identified in act 412, is presented to the user (act 414) through, for example, a web page in the user's web browser, as will now be described.

According to another embodiment, independently from the tastemaker characterization process, the e-commerce system is used to conduct a survey, or taste test, of one or more users (act 414). The survey includes presenting a plurality of images to the user through a user interface. Each image is representative of an item that is listed on the e-commerce website (e.g., a photograph or other likeness). The user is instructed to select the images representing items that are appealing to the user (e.g., "Click on an item that suits your taste.") The images may be presented in groups or sets (e.g., six at a time), and the user may select one of the images in each group. Based on the user responses during the survey, the e-commerce system can assess the taste of the user and recommend items that are likely to match the taste. During the course of the survey, the e-commerce system receives one or more user selections of the images presented in the survey (act 416). These user selections can be used to match the user with one or more tastemakers based on a correlation between the items preferred by the respective tastemakers and the items selected by the user during the survey (act 418). The premise of this is that there is an increased likelihood that if the user selects items that appeal to him as well as to a tastemaker, then other items preferred by the tastemaker will also appeal to the user. Accordingly, the e-commerce system can then generate a set of recommended items by selecting items that are preferred by the tastemaker(s) matched in act 418. Alternatively, the e-commerce system can generate a set of recommended items by selecting items offered by sellers of the tastemaker's preferred items (act 420). In another alternative, the e-commerce system can generate a set of recommended usernames representing one or more of the tastemakers matched in act 418. These recommended users can be presented to the user, enabling the user to connect with one or more of the recommended users online. Such connections facilitate shopping by enabling users having similar tastes to share item suggestions, e.g., using a treasury. The set of recommended items generated in act 420 is then displayed to the user through a user interface, such as a web page (act 422).

As described above, during the survey the user is presented with a plurality of images of items chosen from a larger set of images in a database (including a set of all images in the database). The user may progressively select one or more of these images during the course of the survey to indicate preferences for certain items over others. The progression follows one of a plurality of pre-computed paths that relate one item to another. Each path represents a collection of items and/or stores listed on the e-commerce website that are reachable in a manner similar to that described above. For example, if Item 1 and Item 2 are both preferred by Tastemaker 1, then there may be a path between Item 1 and Item 2 (whether or not Item 1 and Item 2 are in the same store) or a path between Shop A (containing Item 1) and Shop B (containing Item 2).

At the outset of the survey (e.g., before any information is known about the user), an initial set of images may be randomly chosen for display. Initially, a seed value is randomly set. The seed value is used to calculate the first or next step along the path, and may optionally be used to ensure that the survey is performed consistently for the user. As the user selects images, additional images are chosen based on the pre-computed path corresponding to the user selections, such as paths 544 illustrated in FIG. 5. In other words, the user steps along one of the plurality of pre-computed paths based on which images are selected. In one example, the user is presented with a first set of images. Each image is associated with a path that relates the image to a respective second set of images. Therefore, when the user selects one of the images in the first set, the user is following a path to the respective second set of images. The paths for each image may be the same or dissimilar (e.g., two images in a set may be associated with the same path).

In another embodiment, the path may be refined in different ways, for example, certain paths may be followed by male users that may be different from paths followed by female users, or the paths may be filtered by content (e.g., item descriptions, categories, or other characteristic information about the items). In another example, the path may be refined by enabling the user to shuffle or rearrange the images, or start again at the beginning of the survey. In yet another example, the path may be refined when a taste match is identified, as described below.

Accordingly, in one example, a portion of the survey may be performed according to the following algorithm:

```
If the current path is empty:
    For i = 1 to 6:
        Choose a random shop S from all shops having a reachability factor
of at least N
            Identify a first group of n items with a path that contains only Shop S
                Randomly choose one of the n items
                    Add the item to a result buffer
Else if the current path is not empty:
    Look up tastemakers associated with the current path
    Look up the reachable shops from the current path
    Assign a score for each reachable shop according to how many new
tastemakers are associated with an outgoing path
    If there are fewer than a minimum number x reachable shops, generate a
list of the tastemakers associated with the current path (this is a "match")
    If there are fewer than three tastemakers associated with the current path,
```

-continued

```
generate a list of the tastemakers associated with the current path
(this is also a "match")
    If the length of the path is >= 4, generate a list of the tastemakers
associated with the current path (this is also a "match")
    Else there is no match:
        Identify all tastemakers associated with Shops A and B
        Iterate through all shops reachable from union of Shops A and B
(to identify a Shop C):
            Identify all tastemakers associated with Shop C
            If Shop C contains any tastemakers that are also
associated with Shops A and B, then Shop C is reachable from Shops
A and B and is a candidate
                Randomly choose a candidate Shop C from the list:
                Randomly choose an item from all chooseable
items in Shops A, B and C and add it to the result buffer
Remove choosable items from the result buffer that have the same
tastemaker or shop, but make sure buffer still has at least 6 items
Return 6 items from the result buffer
```

In the above example, if a match is reached, then a list of user IDs corresponding to the generated list of tastemakers is displayed to the user through the user interface. Thus, the user is presented with a list of people (i.e., tastemakers) recommended by the e-commerce system as having similar preferences, or tastes, to the user as determined using the survey responses. The user may then, for example, view a profile, treasury, or other information associated with one or more of the tastemakers. If, on the other hand, no match is reached, the items in the result buffer are displayed to the user (as a new set of images, e.g., six images per set) through the user interface, and the user is allowed to select another image from the new set.

Recommendations

According to one embodiment, the e-commerce system is configured to provide recommendations based on the responses received from the user during the survey. As described above, a list of tastemakers may be generated based on the responses. The list includes tastemakers having similar preferences, or tastes, to the user. Additionally, the e-commerce system may provide recommendations that include other users and/or items. For example, the list of tastemakers may be expanded to include other users who have similar preferences, or tastes, to the tastemakers. One technique for expanding the list is to map each of the tastemakers to other similar users. In turn, each of the similar users is mapped to other similar users. Similarity between any two users may occur, for example, where the two users have favorite items in common or where the two users have purchased and/or sold similar items. The strength of the similarity between the two users is represented by a pre-computed score (e.g., a higher score represents a high number of similar favorites, etc.). The resulting set of similar users may then be displayed to the user through the user interface.

In one example, after completing the survey, the user is matched to Tastemakers A, B and C. Each tastemaker is compared with a set of other users (which may be all other users of the e-commerce website or a subset thereof), and the pre-computed similarity score, representing the strength of the similarity, is acquired. Users having the highest scores (i.e., the strongest similarity to the respective tastemaker) are cataloged, e.g., Tastemaker A is similar to Users D and E, Tastemaker B is similar to Users F and G, and Tastemaker C is similar to Users D and H.

Subsequently, a list of recommendable items is generated. The list of recommendable items includes items that are preferred by (or a favorite item of), for example, Tastemakers A, B and C, and Users D, E, F, G and H, items that are preferred by at least 10 users in all, and items that are not blacklisted or otherwise filtered out by content. Examples of blacklisted items include wedding items, adult entertainment items, and supplies. Each item in the list of recommended items is scored based on relevancy. Relevancy includes items having descriptive terms that are similar to descriptive terms that are associated with one or more of the items selected by the user during the survey. For example, if an item selected by the user during the survey includes the term "green," then any item in the list of recommended items also having the term "green" will be assigned a higher relevancy score than items that are not associated with the term "green." The score may be weighted based on several factors, for example, which user prefers the respective item (e.g., items preferred by tastemakers may be weighted more heavily than items preferred by non-tastemaker users), or how similar the respective item is to the items selected by the user during the survey.

At this point, at least three scores have been computed: a tastemaker score, a user similarity score, and an item relevancy score. These scores may optionally be normalized to a value between zero and one and applied to each item in the list of recommended items. Accordingly, the list of recommended items can be sorted, for example, by the normalized score (e.g., high to low) and displayed to the user in the sorted order. In this manner, recommended items having the highest score may be presented before recommended items having lower scores.

Figure 6:
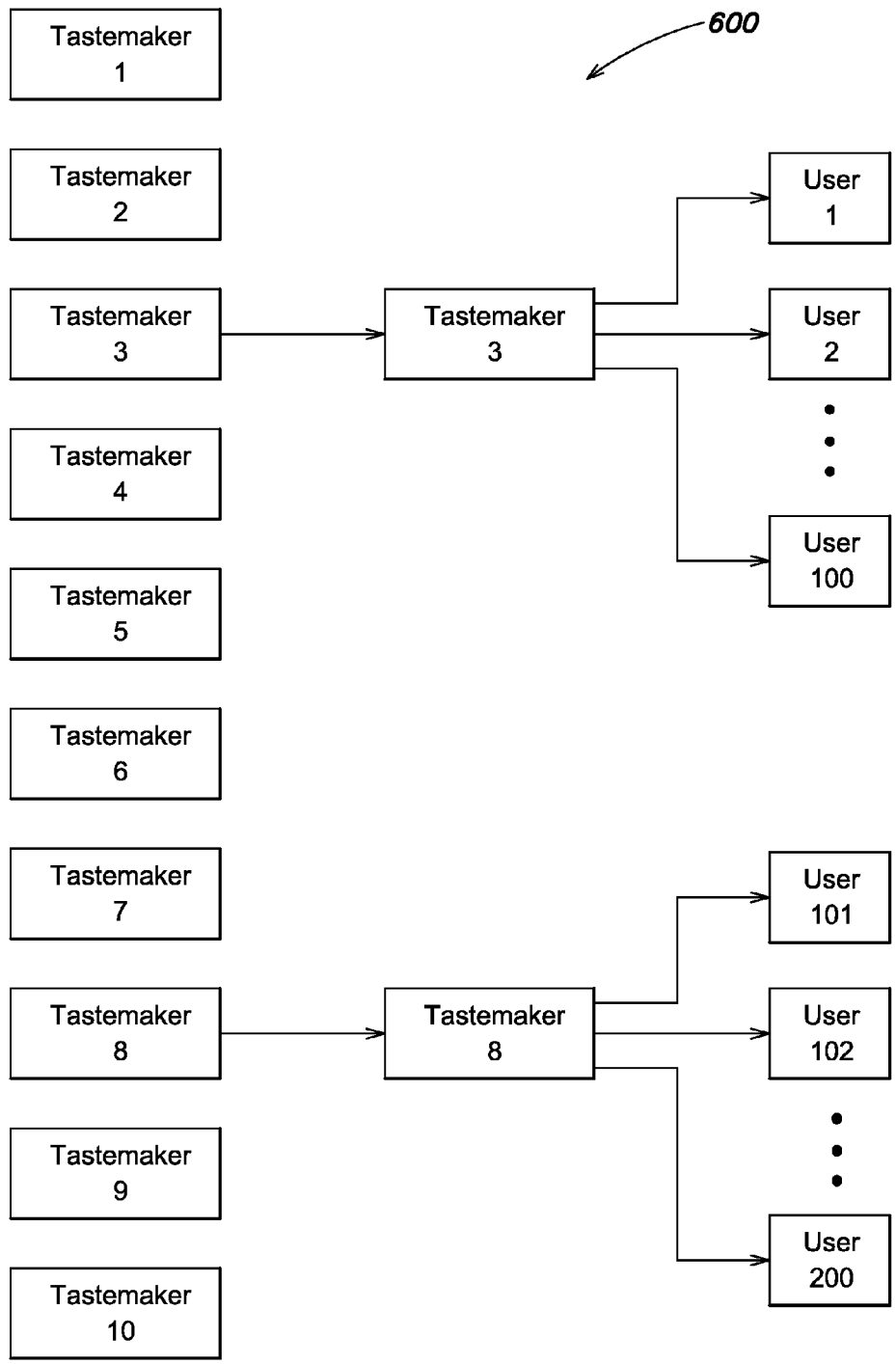
FIG. 6 is a flow diagram showing a user-to-user association process in accordance with one embodiment of the present invention.

FIG. 6 illustrates a flow diagram showing a user-to-user association process 600 in accordance with one embodiment of the present invention. As described above, an image survey can be used to associate a user taking the survey with one or more other users, including tastemakers and other users having similar tastes. For example, the e-commerce system initially selects ten (10) tastemakers (e.g., Tastemakers 1-10) for potential association with the user taking the survey. In other words, at the beginning of the survey, there is no association between the user and any of Tastemakers 1-10. After the survey has been completed, the system identifies, for example, two (2) tastemakers (e.g., Tastemakers 3 and 8) as having an association (i.e., with respect to taste in the items presented during the survey) with the user. At this point, the system can do one or more of the following: recommend, to the user, one or more items preferred by Tastemakers 3 and/or 8; recommend, to the user, Tastemakers 3 and/or 8 (e.g., such that the user may contact the recommended tastemakers or view their online profiles to acquire further recommendations from those tastemakers); and/or identify one or more other users who have similar tastes to Tastemakers 3 and/or 8. These other users are shown in FIG. 6 as Users 1-100 and Users 101-200. It should be understood that any number of other users may be identified; however, recommendations can be improved by expanding the number of recommended users to a large number, such as approximately 100, to increase the pool of users having tastes similar to the user taking the survey. The identified users (e.g., any of Users 1-100 and Users 101-200) can subsequently be recommended to the user taking the survey as potentially having the same tastes in items available on the e-commerce website.

Figure 7A:
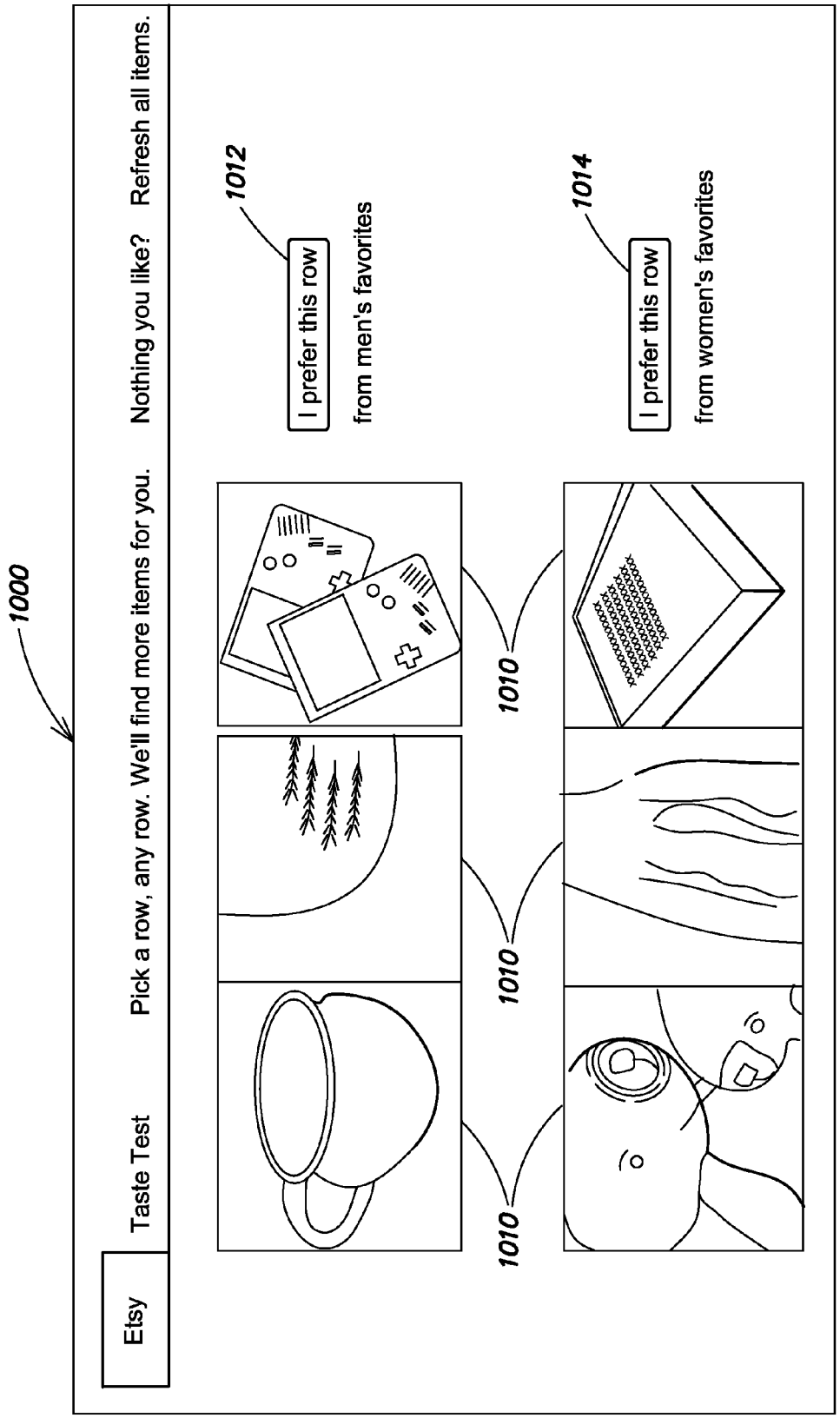
FIG. 7A shows a webpage displaying a plurality of item images in accordance with one embodiment of the present invention.

FIGS. 7A-7D illustrate an image survey user interface in accordance with one embodiment of the present invention. FIG. 7A shows a first webpage 1000, generated by the e-commerce system, displaying a plurality of item images 1010. The plurality of item images 1010 may be arranged in two rows, as shown, along with respective "I prefer this row" buttons 1012 and 1014. First webpage 1000 may be displayed to the user at the beginning of the image survey to enable the user to select an initial item preference, for example, a preference for men's items or women's items. If the user selects button 1012, the survey will continue by presenting items preferred by male tastemakers. If the user selects button 1014, the survey will continue by presenting items preferred by female tastemakers, or by tastemakers of both genders.

Figure 7B:
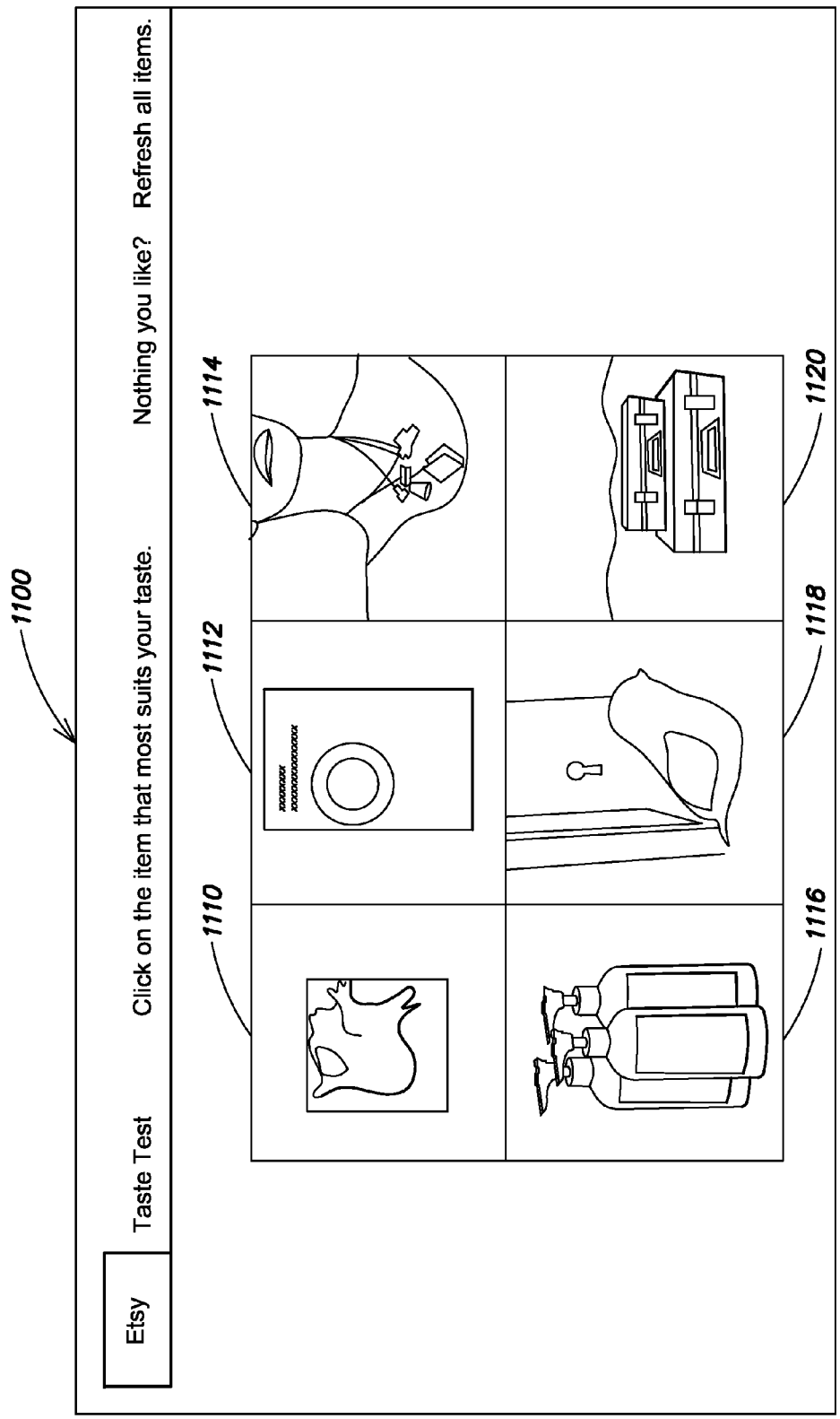
FIG. 7B shows another webpage displaying a plurality of item images in accordance with the embodiment of FIG. 7A.

FIG. 7B shows a second webpage 1110, generated by the e-commerce system, displaying a plurality of item images 1110, 1112, 1114, 1116, 1118, and 1120. The user may then select one of the item images, for example, image 1120. Preferably, the user will select the item image that the user most closely relates to his or her taste or preferences. As discussed above, each of the items 1110, 1112, 1114, 1116, 1118, and 1120 may be associated with one or more tastemakers.

Figure 7D:
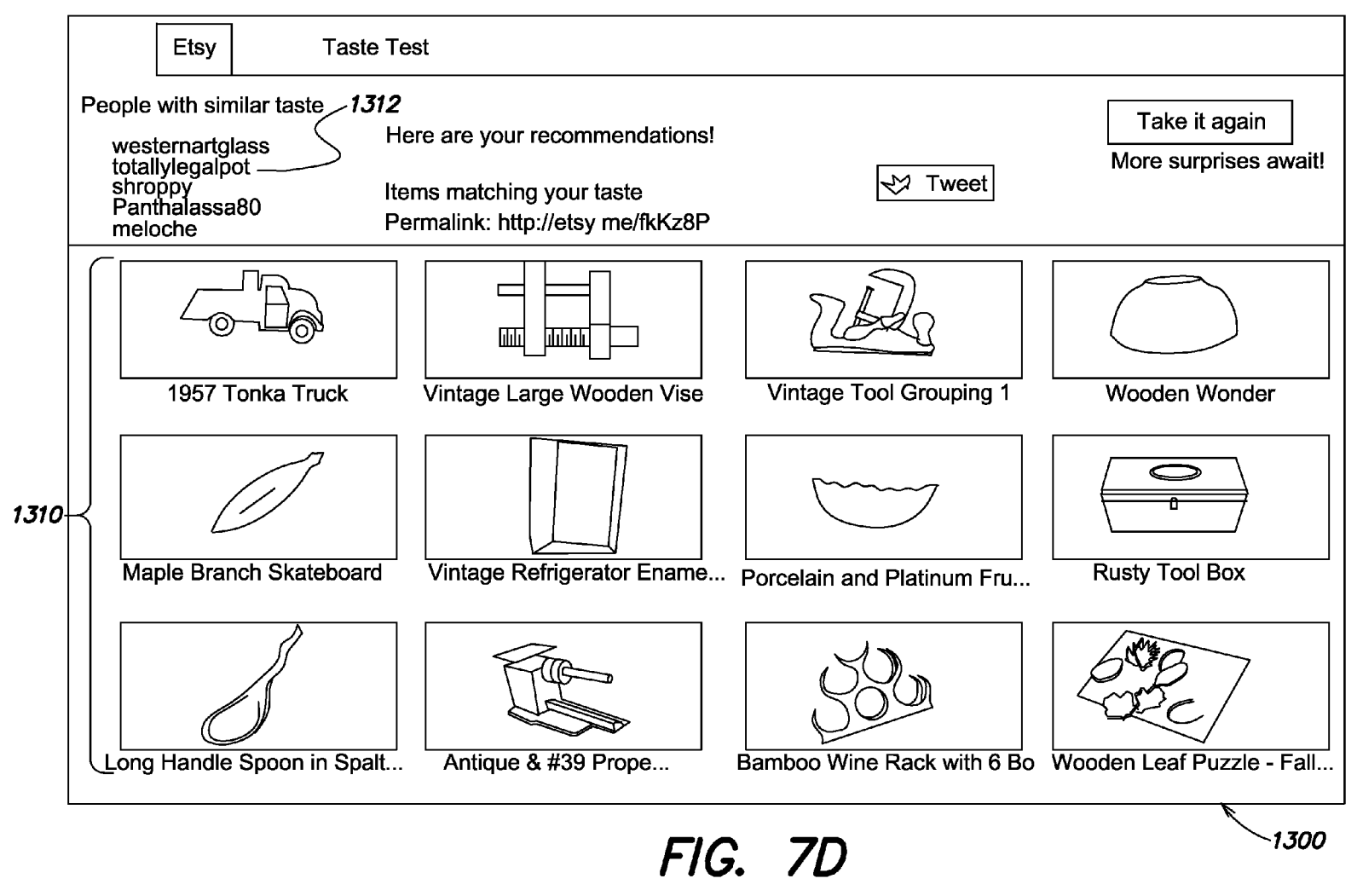

FIG. 7C shows a third webpage 1200, generated by the e-commerce system, displaying a plurality of item images 1210, 1212, 1214, 1216, 1218, and 1220. Also displayed is item image 1120, which was previously selected by the user. The user may then select one of the item images, such as described above. This process of displaying item images and receiving user selections may repeat any number of times to enable the user to select multiple items of interest. Each selection is stored by the e-commerce system in a database and subsequently used to generate further survey webpages and/or to generate recommendations, which may be displayed as illustrated in FIG. 7D. The third webpage 1200, as well as webpages 1000, 1100, or others not shown, may include a progress bar or other informational text, indicated at 1222, to assist the user in taking the survey.

FIG. 7D shows a fourth webpage 1300, generated by the e-commerce system, in response to the image survey. Fourth webpage 1300 displays a plurality of item recommendations 1310 and/or a list of recommended users with similar taste to the user taking the survey based on the user selections received during the survey. The items 1310 may be items previously selected by the user, or items preferred by tastemakers having similar taste to the user, and/or other items sold by sellers of the user's selected items and/or sellers of items preferred by one or more of the tastemakers.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method performed on an e-commerce computer system, the method comprising:
   identifying a plurality of tastemakers from a plurality of users of an e-commerce website, the plurality of tastemakers selected responsive to acts of:
   assigning, by the e-commerce computer system, a score to each of the plurality of users of the e-commerce website based upon an activity of the each of the plurality of users on the e-commerce website; and
   identifying as tastemakers a first group of the plurality of users who are assigned a higher score than a second group of the plurality of users;
   forming an association between a first user and a tastemaker by presenting an image survey to the first user, the image survey including:
   prompting, through a user interface of a user computing system, the first user to select a first image from a first group of images, each of the images in the first group of images representing one or more merchandise items, each of the images in the first group of images being stored in an image database of the e-commerce computer system and displayed to the first user through the user interface, each of the images in the first group of images representing an item identified as preferred by at least one tastemaker by a preferred item identification engine operating on the e-commerce computer system, prompting, through the user interface, the first user to select a second image from a second group of images, each of the images in the second group of images representing one or more merchandise items identified as preferred by a tastemaker who was also identified to prefer the merchandise item represented by the first image, each of the images in the second group of images being stored in the image database and displayed to the first user through the user interface, and receiving, through a computer network, by the e-commerce computer system, an image selection of the first image and an image selection of the second image from the first user through the user interface;

determining, by the e-commerce computer system, a shopping preference of the first user based, at least in part, on the association formed between the first user and the tastemaker, the shopping preference of the first user including information about the one or more merchandise items represented by the first image and the one or more merchandise items represented by the second image;

identifying, by the e-commerce computer system, a second user having a shopping preference that is substantially similar to the shopping preference of the first user, the shopping preference of the second user including information, stored in a user preference database of the e-commerce computer system, about one or more preferred merchandise items of the second user;

generating, by the e-commerce computer system, at least one shopping recommendation based on the shopping preference of the second user utilizing a recommendation engine of the e-commerce computer system; and presenting the at least one shopping recommendation to the first user through the user interface.

2. The computer-implemented method of claim 1, wherein identifying the second user includes assigning, by the computer system, a score to the second user according to an algorithm operative to use different types of activity stored in an activity database including a frequency at which the second user has identified, to the computer system, the one or more preferred merchandise items of the second user, wherein the computer-implemented method further comprises ranking the second user according to the score, and wherein generating the at least one shopping recommendation is further based on the ranking of the second user.

3. The computer-implemented method of claim 1, wherein identifying the second user includes assigning, by the computer system, a score to the second user according to an algorithm operative to use different types of activity stored in an activity database including, for each of the one or more preferred merchandise items of the second user, a quantity of the one or more preferred merchandise items of the second user that are preferred by a user other than the second user, wherein the computer-implemented method further comprises ranking the second user according to the score, and wherein generating the at least one shopping recommendation is further based on the ranking of the second user.

4. The computer-implemented method of claim 1, wherein identifying the second user includes assigning, by the computer system, a score to the second user according to an algorithm operative to use different types of activity stored in an activity database including a percentage of the one or more preferred merchandise items of the second user that have been purchased by a user other than the second user, wherein the computer-implemented method further comprises ranking the second user according to the score, and wherein generating the at least one shopping recommendation is further based on the ranking of the second user.

5. The computer-implemented method of claim 1, wherein identifying the second user includes assigning, by the computer system, a score to the second user according to an algorithm operative to use different types of activity stored in an activity database including a percentage of the one or more preferred merchandise items of the second user that have been purchased by the second user, wherein the computer-implemented method further comprises ranking the second user according to the score, and wherein generating the at least one shopping recommendation is further based on the ranking of the second user.

6. The computer-implemented method of claim 1, wherein the one or more preferred merchandise items of the second user includes at least one of a favorite item of the second user, an item purchased by the second user, an item sold by the second user, an item browsed by the second user, and an item curated by the second user in a treasury.

7. The computer-implemented method of claim 1, wherein the at least one shopping recommendation includes at least one of the one or more preferred merchandise items of the second user.

8. The computer-implemented method of claim 1, wherein the at least one shopping recommendation includes a username of the second user, the username being selectable by the first user within the user interface to cause the computer system to provide, to the first user through the user interface, information about the second user including a list of favorite items of the second user.

9. The computer-implemented method of claim 1, further comprising choosing, by the computer system, one of the first group of images and the second group of images from the image database based on the shopping preference of the second user.

10. The computer-implemented method of claim 1, wherein the the one or more preferred merchandise items of the second user includes a first merchandise item represented by the first image and a second merchandise item represented by the second image.

11. The computer-implemented method of claim 1, wherein the information about the one or more merchandise items includes a description of a respective one of the one or more merchandise items, the description to be stored in an item listing database, the description including at least one of a name, color, style, shape, texture, material, construction, origin, age, function, and appearance.

12. The computer-implemented method of claim 1, wherein the information about the one or more preferred merchandise items of the second user includes an association between each of the one or more preferred merchandise items of the second user and a user profile of the second user.

13. The computer-implemented method of claim 1, further comprising storing shopping recommendation data including the at least one shopping recommendation in a shopping recommendation database, and enabling the first user to retrieve the shopping recommendation data through the user interface.

14. An e-commerce computer system including a non-transient computer readable medium having computer-executable instructions stored thereon, the computer-executable instructions when executed by the e-commerce computer system causing the e-commerce computer system to perform a method comprising:

identifying a plurality of tastemakers from a plurality of users of an e-commerce website, the plurality of tastemakers selected responsive to acts of:

assigning a score to each of the plurality of users of the e-commerce website based upon an activity of the each of the plurality of users on the e-commerce website; and identifying as tastemakers a first group of the plurality of users who are assigned a higher score than a second group of the plurality of users;

mapping each of a plurality of merchandise items listed in a database to at least one of the plurality of tastemakers;

forming an association between a survey subject and a tastemaker by presenting an image survey to the survey subject, the image survey including:

generating a first webpage having a first plurality of user-selectable images each representing one of a first subset of the plurality of merchandise items, providing the first webpage to the survey subject through a user interface of a user computing system connected to the e-commerce website over a communications network, receiving, through the user interface, a first image selection from the survey subject, the first image selection representing one of the plurality of merchandise items selected by the survey subject, generating a second webpage having a second plurality of user-selectable images each representing one of a second subset of the plurality of merchandise items, providing the second webpage to the survey subject through the user interface of the user computing system, and receiving, through the user interface, a second image selection from the survey subject, the second image selection representing one of the plurality of merchandise items selected by the survey subject;

generating a third webpage having a list of recommended users including at least one of the tastemakers that is mapped to the merchandise item associated with the first image selection and the merchandise item associated with the second image selection; and providing the third webpage to the survey subject through the user interface of the user computing system.

15. The e-commerce computer system of claim 14, wherein the method further comprises mapping each of the plurality of merchandise items to at least one of the plurality of tastemakers based on a preference of the at least one of the plurality of tastemakers for a respective one of the plurality of items.

16. The e-commerce computer system of claim 14, wherein at least one of the first plurality of images and at least one of the second plurality of images each represent a merchandise item preferred by the at least one of the plurality of tastemakers.

17. The e-commerce computer system of claim 16, wherein the merchandise item preferred by the at least one of the plurality of tastemakers is a favorite item of the at least one of the plurality of tastemakers.

18. The computer-implemented method of claim 16, wherein the merchandise item preferred by the at least one of the plurality of tastemakers is an item offered for sale by the at least one of the plurality of tastemakers.

19. The e-commerce computer system of claim 16, wherein the merchandise item preferred by the at least one of the plurality of tastemakers is an item curated by the at least one of the plurality of tastemakers in a treasury.

20. The e-commerce computer system of claim 14, wherein the method further comprising comprises assigning the score to each of the plurality of users based on how frequently the respective one of the plurality of users has selected any merchandise item as a favorite merchandise item over a period of time.

21. The e-commerce computer system of claim 20, wherein the period of time is approximately 120 days.

22. The e-commerce computer system of claim 20, wherein the frequency that the respective one of the plurality of users has selected any merchandise item as a favorite merchandise item is approximately five or more merchandise items per day.

23. The e-commerce computer system of claim 14, wherein the method further comprises assigning the score to each of the plurality of users based on how frequently one or more other users have selected a merchandise item as a favorite merchandise item that is the same merchandise item that the at least one of the plurality of users has selected as a favorite merchandise item.

24. The e-commerce computer system of claim 23, wherein the frequency that the one or more other users have selected the merchandise item as a favorite merchandise item is approximately 500 times.

25. The e-commerce computer system of claim 24, wherein the method further comprises assigning the score to each of the plurality of users based on the frequency with which a favorite merchandise item of each of the plurality of users has been purchased by any user other than the respective one of the plurality of users.

26. The e-commerce computer system of claim 14, wherein the method further comprises assigning the score to each of the plurality of users based on the frequency with which a favorite merchandise item of one of the plurality of users has been purchased by the same one of the plurality of users.

27. A non-transient computer readable medium having computer-executable instructions stored thereon, the computer-executable instructions when executed by a computer causing the computer to perform a method comprising:

identifying a plurality of tastemakers from a plurality of users of an e-commerce website, the plurality of tastemakers selected responsive to acts of:

assigning a score to each of the plurality of users of the e-commerce website based upon an activity of the each of the plurality of users on the e-commerce website; and identifying as tastemakers a first group of the plurality of users who are assigned a higher score than a second group of the plurality of users;

forming an association between a first user and a tastemaker by presenting an image survey to the first user, the image survey including:

prompting, through a user interface, the first user to select one or more images representing merchandise items, the one or more images being stored in an image database, the one or more images each representing an item identified as preferred by at least one tastemaker by a preferred item identification engine operating on the e-commerce system, and receiving, by the computer, one or more responses from the first user through the user interface;

determining a shopping preference of the first user based, at least in part, on the association formed between the first user and the tastemaker, the shopping preference of the first user including information about the merchandise items represented by the one or more image selections;

identifying a second user having a shopping preference that is substantially similar to the shopping preference of the first user, the shopping preference of the second user including information, stored in a user preference database, about one or more preferred merchandise items of the second user;

generating at least one shopping recommendation based on the shopping preference of the second user; and presenting the at least one shopping recommendation to the first user through the user interface.

28. A non-transient computer readable medium having computer-executable instructions stored thereon, the computer-executable instructions when executed by a computer causing the computer to perform a method comprising:

identifying a plurality of tastemakers from a plurality of users of an e-commerce website, the plurality of tastemakers selected responsive to acts of:
  assigning a score to the plurality of users of the e-commerce website based upon an activity of the plurality of users on the e-commerce website; and
  identifying as tastemakers a first group of the plurality of users who are assigned a higher score than a second group of the plurality of users;
mapping each of a plurality of merchandise items listed in a database to at least one of the plurality of tastemakers;
forming an association between a survey subject and a tastemaker by presenting an image survey to the survey subject, the image survey including:
  generating a first webpage having a first plurality of user-selectable images each representing one of a first subset of the plurality of merchandise items,
  providing the first webpage to the survey subject through a user interface of a user computing system connected to the e-commerce website over a communications network,
  receiving, through the user interface, a first image selection from the survey subject, the first image selection representing one of the plurality of merchandise items selected by the survey subject,
  generating a second webpage having a second plurality of user-selectable images each representing one of a second subset of the plurality of merchandise items,
  providing the second webpage to the survey subject through the user interface of the user computing system, and
  receiving, through the user interface, a second image selection from the survey subject, the second image selection representing one of the plurality of merchandise items selected by the survey subject;
generating a third webpage having a list of recommended users including at least one of the tastemakers that is mapped to the merchandise item associated with the first image selection and the merchandise item associated with the second image selection; and
providing the third webpage to the survey subject through the user interface of the user computing system.

29. A system, comprising:
a memory;
at least one processor coupled to the memory, the processor being configured to identify a plurality of tastemakers from a plurality of users of an e-commerce website, the plurality of tastemakers selected responsive to acts of assigning a score to each of the plurality of users of the e-commerce website based upon an activity of the each of the plurality of users on the e-commerce website and identifying as tastemakers a first group of the plurality of users who are assigned a higher score than a second group of the plurality of users, the processor being further configured to form an association between a first user and a tastemaker by presenting an image survey to the first user, the image survey including prompting through a user interface, a first user to select one or more images each representing one or more merchandise items, the one or more images each representing an item identified as preferred by at least one tastemaker by a preferred item identification engine operating on the e-commerce system, the one or more images being stored in the memory and to be displayed to the first user through the user interface, and receiving one or more image selections from the first user through the user interface, the processor being further configured to determine a shopping preference of the first user based, at least in part, on the association formed between the first user and the tastemaker, the shopping preference of the first user including information about the one or more merchandise items represented by the one or more image selections, the processor being further configured to identify a second user having a shopping preference that is substantially similar to the shopping preference of the first user, the shopping preference of the second user including information, stored in the memory, about one or more preferred merchandise items of the second user, the processor being further configured to generate at least one shopping recommendation based on the shopping preference of the second user, and the processor being further configured to present the at least one shopping recommendation to the first user through the user interface.

30. The computer-implemented method of claim 1, wherein the second user is the tastemaker.

* * * * *

UNITED STATES PATENT AND TRADEMARK OFFICE
CERTIFICATE OF CORRECTION

PATENT NO.         : 8,762,226 B2
APPLICATION NO.    : 13/100810
DATED              : June 24, 2014
INVENTOR(S)        : Kalin et al.

It is certified that error appears in the above-identified patent and that said Letters Patent is hereby corrected as shown below:

In the Specification:

Column 6, line 42, delete "wilds" and insert --wikis--.

In the Claims:

Column 22, claim 20, line 6, delete "comprising".

Signed and Sealed this
Eleventh Day of November, 2014

Michelle K. Lee
*Deputy Director of the United States Patent and Trademark Office*